United States Patent
Lowenthal et al.

(10) Patent No.: US 11,407,320 B2
(45) Date of Patent: Aug. 9, 2022

(54) TRANSMITTING NOTIFICATION MESSAGES FOR AN ELECTRIC VEHICLE CHARGING NETWORK

(71) Applicant: ChargePoint, Inc., Campbell, CA (US)

(72) Inventors: Richard Lowenthal, Cupertino, CA (US); Praveen Mandal, Los Altos Hills, CA (US); Milton Tormey, Los Altos, CA (US); David Baxter, Monte Sereno, CA (US); Harjinder Bhade, San Jose, CA (US); James Solomon, Saratoga, CA (US); Srinivas Swarnapuri, San Jose, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

(21) Appl. No.: 16/259,871

(22) Filed: Jan. 28, 2019

(65) Prior Publication Data

US 2019/0152339 A1    May 23, 2019

Related U.S. Application Data

(63) Continuation of application No. 12/372,726, filed on Feb. 17, 2009, now Pat. No. 10,189,359.

(51) Int. Cl.
*G06F 15/16* (2006.01)
*B60L 53/14* (2019.01)
(Continued)

(52) U.S. Cl.
CPC ............ *B60L 53/14* (2019.02); *B60L 3/0046* (2013.01); *B60L 3/0069* (2013.01); *B60L 3/12* (2013.01);
(Continued)

(58) Field of Classification Search
CPC .......... H04L 41/12; H04L 67/12; B60L 53/14; B60L 53/64; B60L 55/00; B60L 53/63;
(Continued)

(56) References Cited

U.S. PATENT DOCUMENTS 5,297,664 A    3/1994 Tseng et al.
5,563,491 A *  10/1996 Tseng .................. G07F 17/0014
                                                       320/109
(Continued)

FOREIGN PATENT DOCUMENTS

| JP | 2006074868 A | 3/2006 |
| WO | 2007141543 A2 | 12/2007 |
| WO | 2008157443 A2 | 12/2008 |

OTHER PUBLICATIONS

"Elektrobay: User Instructions, A Simple Step-by-Step Guide to Recharging Your Electric Vehicle," Elektromotive Ltd, The Sussex Innovation Centre, United Kingdom, 2008, 3 pages.
(Continued)

*Primary Examiner* — Hua Fan
(74) *Attorney, Agent, or Firm* — Nicholson De Vos Webster & Elliott LLP (57) ABSTRACT

An electric vehicle charging station network server that manages a plurality of charging stations receives subscriber notification message preferences for a subscriber (e.g., electric vehicle operator) that indicate one or more events of interest for which the subscriber wishes to receive notification messages. A set of one or more contact points associated with the subscriber is also received. The server receives data associated with the subscriber that indicates that a charging session at one of the charging stations has been established for an electric vehicle associated with the subscriber. The server detects an event of interest for the subscriber and
(Continued)

transmits a notification message for that event to at least one of the set of contact points associated with the subscriber.

27 Claims, 7 Drawing Sheets

(51) Int. Cl.
| | | |
|---|---|---|
| *B60L 3/00* | (2019.01) | |
| *B60L 3/12* | (2006.01) | |
| *B60L 53/64* | (2019.01) | |
| *B60L 55/00* | (2019.01) | |
| *B60L 53/63* | (2019.01) | |
| *B60L 53/65* | (2019.01) | |
| *B60L 53/66* | (2019.01) | |
| *B60L 53/30* | (2019.01) | |

(52) U.S. Cl.
CPC ............ *B60L 53/305* (2019.02); *B60L 53/63* (2019.02); *B60L 53/64* (2019.02); *B60L 53/65* (2019.02); *B60L 53/665* (2019.02); *B60L 55/00* (2019.02); *B60L 2240/80* (2013.01); *B60L 2250/10* (2013.01); *B60L 2250/16* (2013.01); *B60L 2260/52* (2013.01); *B60L 2260/54* (2013.01); *B60L 2260/58* (2013.01); *B60L 2270/32* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/12* (2013.01); *Y04S 30/14* (2013.01)

(58) Field of Classification Search
CPC ...... B60L 53/65; B60L 53/665; B60L 53/305; B60L 3/0046; B60L 3/0069; B60L 3/12; B60L 2240/80; B60L 2250/10; Y02T 90/16; Y02T 90/167
See application file for complete search history.

(56) References Cited

U.S. PATENT DOCUMENTS

| | | | |
|---|---|---|---|
| 5,711,648 | A | 1/1998 | Hammerslag |
| 6,909,950 | B2 | 6/2005 | Shimizu |
| 6,975,612 | B1 | 12/2005 | Razavi et al. |
| 6,975,997 | B1 | 12/2005 | Murakami et al. |
| 7,747,739 | B2 | 6/2010 | Bridge et al. |
| 2003/0097485 | A1 | 5/2003 | Horvitz et al. |
| 2003/0169018 | A1 | 9/2003 | Berels et al. |
| 2003/0221118 | A1 | 11/2003 | Walker |
| 2005/0044245 | A1 | 2/2005 | Hoshina |
| 2005/0259371 | A1* | 11/2005 | Henze .................. B60L 3/0023 361/44 |
| 2006/0270430 | A1 | 11/2006 | Milstein et al. |
| 2007/0162550 | A1 | 7/2007 | Rosenberg |
| 2008/0039989 | A1 | 2/2008 | Pollack et al. |
| 2008/0040263 | A1 | 2/2008 | Pollack et al. |
| 2008/0040479 | A1 | 2/2008 | Bridge et al. |
| 2008/0177994 | A1 | 7/2008 | Mayer |
| 2008/0281663 | A1 | 11/2008 | Hakim et al. |
| 2008/0312782 | A1* | 12/2008 | Berdichevsky ......... B60L 53/64 701/22 |
| 2009/0063680 | A1 | 3/2009 | Bridges et al. |
| 2009/0076915 | A1 | 3/2009 | Tighe |
| 2009/0287578 | A1 | 11/2009 | Paluszek et al. |
| 2009/0313104 | A1 | 12/2009 | Hafner et al. |
| 2009/0323239 | A1 | 12/2009 | Markyvech |
| 2010/0013434 | A1 | 1/2010 | Taylor-Haw et al. |
| 2010/0017249 | A1 | 1/2010 | Fincham et al. |
| 2010/0049610 | A1* | 2/2010 | Ambrosio ............... G06Q 30/02 705/14.62 |
| 2010/0049737 | A1* | 2/2010 | Ambrosio ........... B60L 11/1824 705/412 |
| 2010/0070107 | A1 | 3/2010 | Berkobin et al. |
| 2010/0138098 | A1* | 6/2010 | Takahara ............ B60L 15/2045 701/31.4 |
| 2010/0152960 | A1 | 6/2010 | Huber et al. |
| 2010/0228601 | A1 | 9/2010 | Vaswani et al. |

OTHER PUBLICATIONS

Extended European Search Report for Application No. EP20100744268, dated Mar. 1, 2017, 10 pages.
Final Office Action from U.S. Appl. No. 12/372,726, dated Jan. 2, 2015, 26 pages.
Final Office Action from U.S. Appl. No. 12/372,726, dated Sep. 15, 2011, 32 pages.
Final Office Action from U.S. Appl. No. 12/372,726, dated Jul. 7, 2016, 14 pages.
First Examination Report from foreign counterpart Australian Patent Application No. 2016208355, dated May 2, 2017, 3 pages.
International Preliminary Report on Patentability for Application No. PCT/US2010/024496, dated Sep. 1, 2011, 8 pages.
Non-Final Office Action from U.S. Appl. No. 12/372,726, dated Feb. 15, 2011, 33 pages.
Non-Final Office Action from U.S. Appl. No. 12/372,726, dated Jan. 26, 2016, 13 pages.
Non-Final Office Action from U.S. Appl. No. 12/372,726, dated Jun. 4, 2014, 25 pages.
Non-Final Office Action from U.S. Appl. No. 12/372,726, dated Sep. 22, 2010, 33 pages.
Notice of Allowance from U.S. Appl. No. 12/372,726, dated Sep. 13, 2018, 7 pages.
International Search Report and Written Opinion for Application No. PCT/US2010/024496, dated Apr. 16, 2010, 11 pages.
Communication pursuant to Article 94(3) EPC for Application No. 10744268.3, dated Jan. 29, 2019, 6 pages.

* cited by examiner

FIG. 6

TRANSMITTING NOTIFICATION MESSAGES FOR AN ELECTRIC VEHICLE CHARGING NETWORK

CROSS-REFERENCE TO RELATED APPLICATIONS

This application is a continuation of application Ser. No. 12/372,726, filed Feb. 17, 2009, which is hereby incorporated by reference.

BACKGROUND

Field

Embodiments of the invention relate to the field of charging electric vehicles, and more specifically to transmitting notification messages for an electric vehicle charging network.

Background

Charging stations are typically used to provide charging points for electric vehicles (e.g., electric battery powered vehicles, gasoline/electric battery powered vehicle hybrid, etc.). Since vehicles with electric batteries must periodically recharge their electric battery(ies) (or other electricity storage devices such as supercapacitors), charging stations provide convenient access for that charging. For example, charging stations may be located in designated charging locations (e.g., similar to locations of gas stations), parking spaces (e.g., public parking spaces and/or private parking space), etc.

A typical charging station includes a power receptacle to receive an electrical plug (coupled with the battery). The charging station may include a door, which may be lockable, to cover and protect the power receptacle and prevent unauthorized access to the power receptacle. For example, prospective customers typically request service from the charging station (e.g., by waving a radio-frequency identification (RFID) device near a RFID receiver on the charging station). If the customer is authorized, the door will unlock allowing the customer to plug in their charging cord into the receptacle. The door locks when shut (with the cord inside) which prevents an unauthorized removal of the charging cord. The door may be unlocked by the same customer (e.g., by waving the same RFID device near the RFID receiver on the charging station) in order to remove the charging cord.

Electric vehicles can be recharged from a local electricity grid. These vehicles can also be a source of electric power to be transferred to the local electricity grid. The transfer of electricity stored in electric vehicles to the local electric grid is referred to as vehicle-to-grid (V2G). V2G is particularly attractive for electric vehicles which have their own charging devices, such as battery electric vehicles with regenerative braking and plug-in hybrid vehicles. V2G may help meet demand for electricity when demand is at its highest.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more computing devices (e.g., charging stations, charging station network servers, etc.). As used herein, a charging station is a piece of equipment, including hardware and software, to charge electric vehicles. Such computing devices store and communicate (internally and with other computing devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given device typically stores code and/or data for execution on the set of one or more processors of that device. Of course, one or more parts of an embodiment of the invention may be implemented using different combinations of software, firmware, and/or hardware.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

Figure 1:
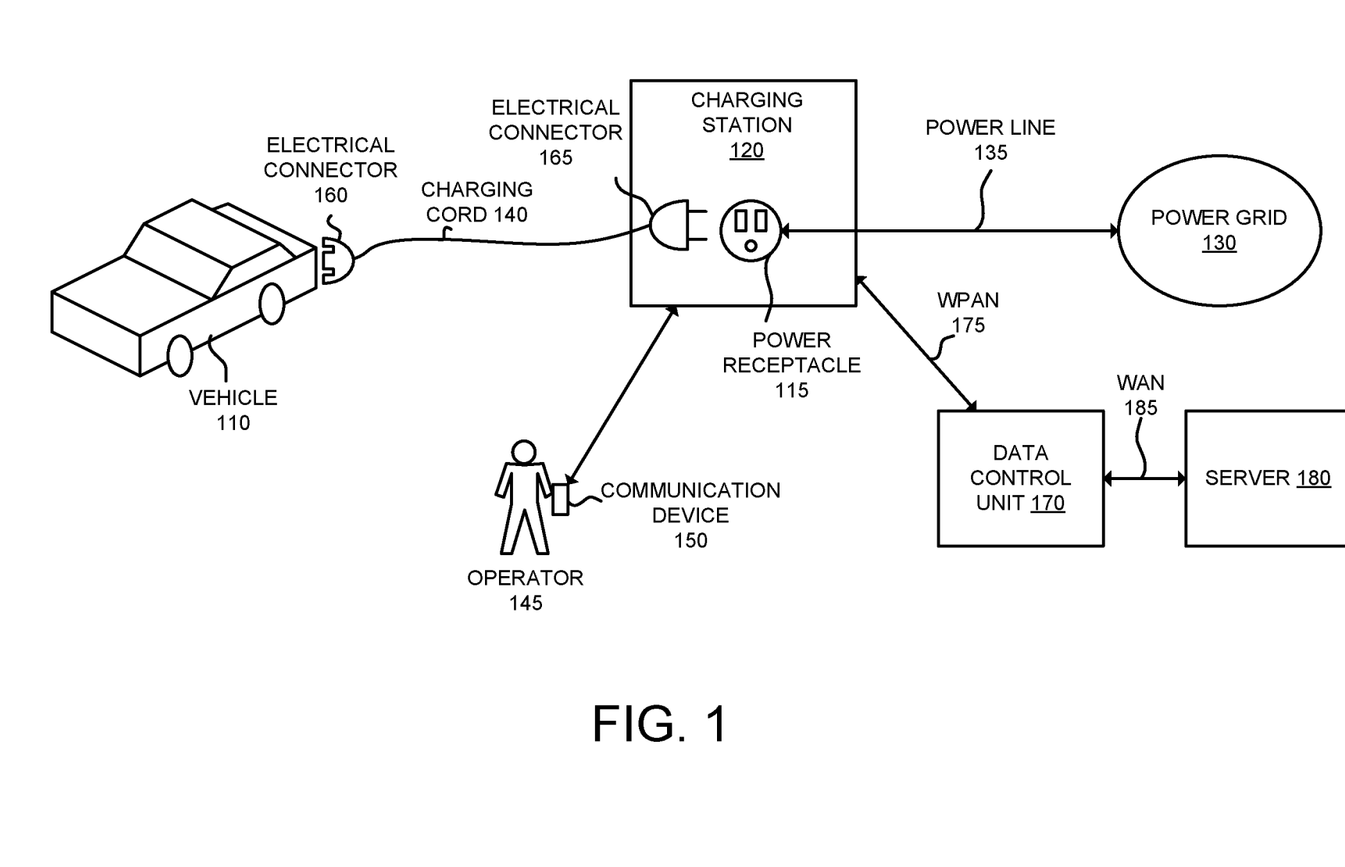
FIG. 1 illustrates an exemplary charging system according to one embodiment of the invention.

FIG. 1 illustrates an exemplary charging system according to one embodiment of the invention. The charging system illustrated in FIG. 1 includes the electric vehicle charging station 120 (hereinafter referred to as the "charging station 120"), which is coupled with the power grid 130 over the power line 135. The power grid 130 may be owned and/or operated by local utility companies or owned and/or operated by private persons/companies. The charging station 120 is also coupled with the data control unit 170 over the WPAN (Wireless Personal Area Network) line 175 (e.g., Bluetooth, ZigBee, etc.) or other LAN (Local Area Network) links (e.g., Ethernet, PLC, WiFi, etc.). The data control unit 170 is coupled with the electric vehicle charging station network server 180 (hereinafter "server" 180) over the WAN (Wide Access Network) connection 185 (e.g., Cellular (e.g., CDMA, GPRS, etc.) WiFi Internet connection, Plain Old Telephone Service, leased line, etc.). The data control unit 170 relays messages between the charging station 120 and the server 180. According to one embodiment of the invention, the data control unit 170 is part of another charging station as will be described in more detail with reference to FIG. 2.

The charging station 120 controls the application of electricity from the power grid 130 to the power receptacle 115. The power receptacle 115 may be any number of types of receptacles such as receptacles conforming to the NEMA (National Electrical Manufacturers Association) standards 5-1 5, 5-20, and 14-50 or other standards (e.g., BS 1363, CEE7, etc.) and may be operating at different voltages (e.g., 120V, 240V, 230V, etc.). According to one embodiment of the invention, a lockable door covers the power receptacle 115 and is locked in a closed position (without a cord being plugged in while the charging station 120 is not in use) and locked in a charging position (while a cord is plugged into the power receptacle during a charging session). While the door is locked in the charging position, the charging cord plugged into the power receptacle 115 cannot be removed. Only authorized vehicle operators (those authorized to use the charging station 120) and authorized administrative personnel can unlock the door to access the power receptacle 115. Thus, access to the power receptacle 115 is limited to authorized vehicle operators and administrative personnel (e.g., utility workers, operators of the charging system network, etc.). Thus, the locking door protects the power receptacle 115 while the charging station 120 is not in use and also prevents charging cords from being unplugged by unauthorized persons during charging.

Operators of vehicles may use the charging station 120 to charge their electric vehicles. For example, the electricity storage devices (e.g., batteries, supercapacitors, etc.) of electric vehicles (e.g., electric powered vehicles, gasoline/electric powered vehicle hybrids, etc.) may be charged through use of the charging station 120. In one embodiment of the invention, the operators of electric vehicles provide their own charging cord to charge their electric vehicle. For example, the electric vehicle operator 145 plugs the electrical connector 160 of the charging cord 140 into on-board charging circuitry of the electric vehicle 110 (which is coupled with the electricity storage device of the vehicle 110) and plugs the electrical connector 165 of the charging cord 140 into the power receptacle 115.

The electric vehicle operator 145 may use the communication device 150 to initiate and request a charging session for the electric vehicle 110. The communication device 150 may be a WLAN or WPAN device (e.g., one or two-way radio-frequency identification (RFID) device, mobile computing device (e.g., laptops, palmtop, smartphone, multimedia mobile phone, cellular phone, etc.)), ZigBee device, etc. The communication device 150 communicates unique operator-specific information (e.g., operator identification information, etc.) to the charging station 120 (either directly or indirectly through the server 180). In some embodiments of the invention, electric vehicle operator 145 may use the communication device 150 to monitor the charging status of the electric vehicle 110. In one embodiment of the invention, the communication device 150 may be coupled with the electric vehicle 110.

Based on the information communicated by the communication device 150, a determination is made whether the operator 145 is authorized to use the charging station 120 and thus may access the power receptacle 115. In one embodiment of the invention, the charging station 120 locally determines whether the operator 145 is authorized (e.g., by checking whether the operator 145 is represented on a list of authorized users stored in the charging station 120). In another embodiment of the invention, the charging station 120 may transmit an authorization request that includes the information read from the communication device 150 to the server 180 (through the data control unit 170) for authorization. In another embodiment of the invention, the server 180 receives the charging session request from the operator 145 directly and determines whether the operator 145 is authorized. In any of these embodiments, if the operator 145 is authorized, the charging station 120 energizes the power receptacle 115. Additionally, if there is a locked door covering the power receptacle 115, the charging station 120 unlocks that door to allow the operator 145 to plug in the charging cord 140.

It should be understood that the operator 145 may request a charging session from the charging station 120 differently in some embodiments of the invention. For example, the operator 145 may interact with a payment station coupled with the charging station 120, which may then send appropriate instructions to the charging station 120 regarding the charging of the vehicle 110 (e.g., instructions to unlock the door covering the power receptacle 115, energize the power receptacle 115, etc.). The payment station may function similarly to a payment station for a parking space. In addition, the payment station coupled with the charging station may be used both for parking payment and charging payment.

According to one embodiment of the invention, a charging session is established after an operator has been authenticated and authorized to initiate a charging session (e.g., may use the charging station 120 at the particular time of the day), after a charging cord has been plugged into the power receptacle 115, and after the door to the power receptacle 115 has been closed and locked. For example, a charging session is established with the vehicle 110 after the operator 145 has been authorized, after the charging cord 140 has been plugged into the power receptacle 115, and after the door covering the power receptacle 115 has been closed and locked.

The server 180 provides services for multiple charging stations. The server 180 stores vehicle operator information (e.g., operator account information, operator contact information (e.g., operator name, street address, email address, telephone number, etc.)) and typically is responsible for accounting (e.g., amount of electricity purchased by individual vehicle operators, etc.). In one embodiment of the invention, the server 180 includes a subscriber portal (available through the Internet) which allows subscribers (owners and operators of electric vehicles) to register for service (which may include providing information regarding their electric vehicles, providing payment information, providing contact information, etc.) and perform other functions (e.g., pay for charging sessions, determine availability of charging stations, check the charging status of their electric vehicle(s), etc.). In addition, the server 180 may include a host portal (available through the Internet) which allows owners or administrators of the charging station to configure their charging stations and perform other functions (e.g., determine average usage of charging stations, etc.). Charging stations may also be configured using other means (e.g., through Telnet, user interface, etc.) in some embodiments of the invention.

Figure 2:
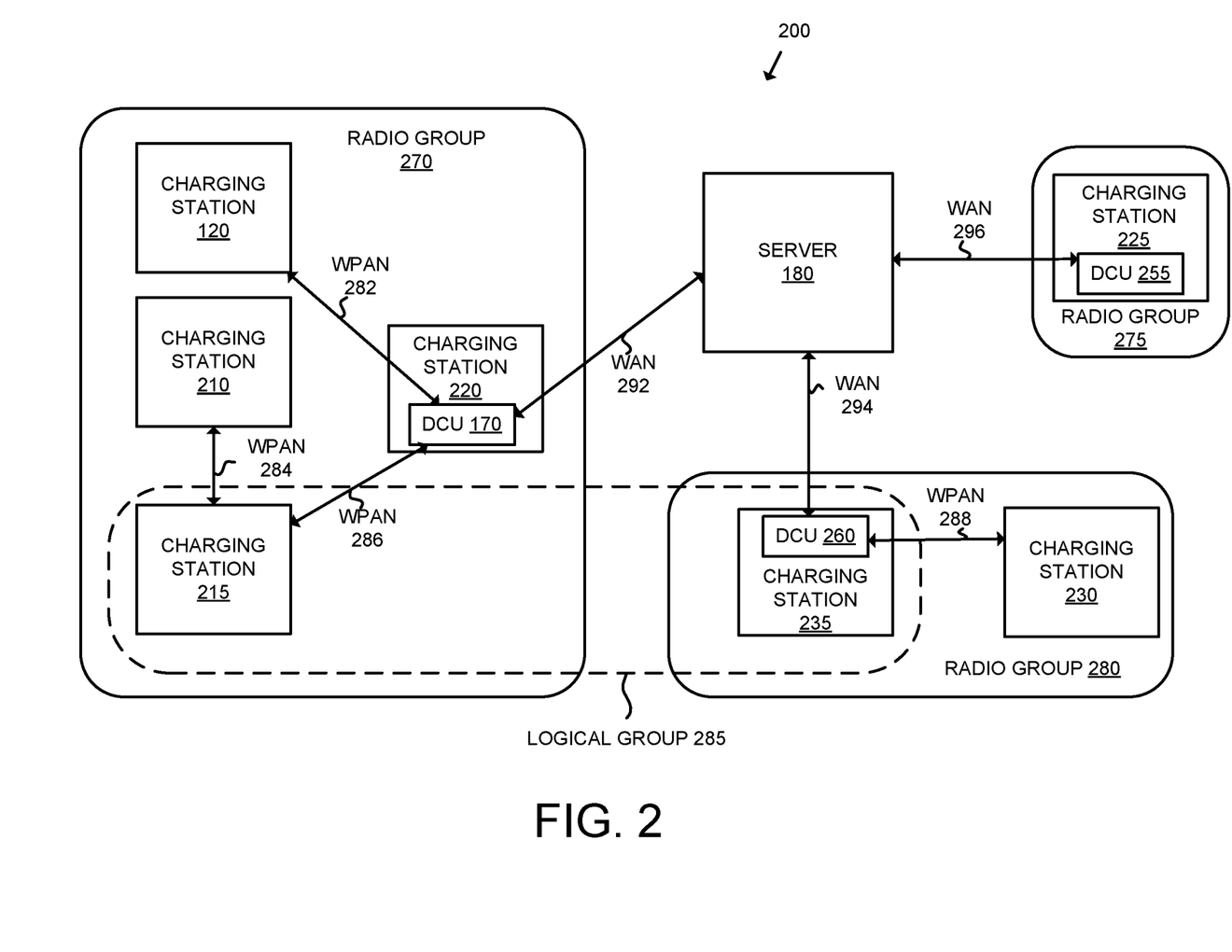
FIG. 2 illustrates an exemplary network of charging stations according to one embodiment of the invention.

While FIG. 1 illustrates a single charging station 120, it should be understood that many charging stations may be networked to the server 180 (through one or more data control units) and/or to each other. FIG. 2 illustrates an exemplary network of charging stations according to one embodiment of the invention. The charging station network 200 includes the server 180 and the charging stations 120, 210, 215, 220, 225, 230, and 235. The server 180 is providing services for each of the charging stations 120, 210, 215, 220, 225, 230, and 235. The charging stations 120, 210, 215, and 220 are part of the radio group 270. The charging stations 230 and 235 are part of the radio group 280. The charging station 225 is the only charging station in the radio group 275. As used herein, a radio group is a collection of one or more charging stations that collectively has a single connection to a server. Each radio group includes one or more data control units (DCUs) which connect the charging stations with the server. Typically, DCUs are implemented along with a charging station. However, a data control unit may be implemented separately from any charging station.

Each DCU acts as a gateway to the server 180 for those charging stations that are coupled with that DCU. It should be understood that charging stations need not have a direct link to a DCU (e.g., a charging station may be directly linked to another charging station which itself has a direct link to a DCU). For example, DCU 170 (of the radio group 270 and implemented in the charging station 220) is coupled with the server 180 through the WAN link 292 and is coupled with each of the charging stations 120, 210, and 215. The charging stations 120 and 215 are directly coupled with the DCU 170 via the WPAN links 282 and 286 respectively. The charging station 210 is indirectly coupled with the DCU 170 via the WPAN link 284 to the charging station 215 which is itself directly coupled with the DCU 170 via the WPAN link 286. Thus, the charging stations 120, 210, and 215 transmit messages to, and receive messages from, the server 180 via the DCU 170. The DCU 225 (of the radio group 275 and part of the charging station 225) is coupled with the server 180 through the WAN link 296. The DCU 260 (of the radio group 280) is coupled with the server 180 through the WAN link 294 and is coupled with the charging station 230 via the WPAN link 288.

Radio groups represent the network topology of a collection of charging stations. Typically, these charging stations are located relatively close (e.g., on the same street, in the same parking garage, in the same block, etc.). In addition to radio groups, administrator defined collection of charging stations may also be defined. For example, the charging stations 215 and 235 are part of the logical group 285. Logical groups are a collection of one or more charging stations that an administrator defines. Typically, the charging stations included in a logical group share some set of common features. As illustrated in FIG. 2, logical groups may include charging stations from different radio groups.

It should be understood that the network architecture illustrated in FIG. 2 is exemplary, and other architectures may be used in embodiments of the invention (e.g., each charging station may have a direct connection with the server 180).

Figure 3:
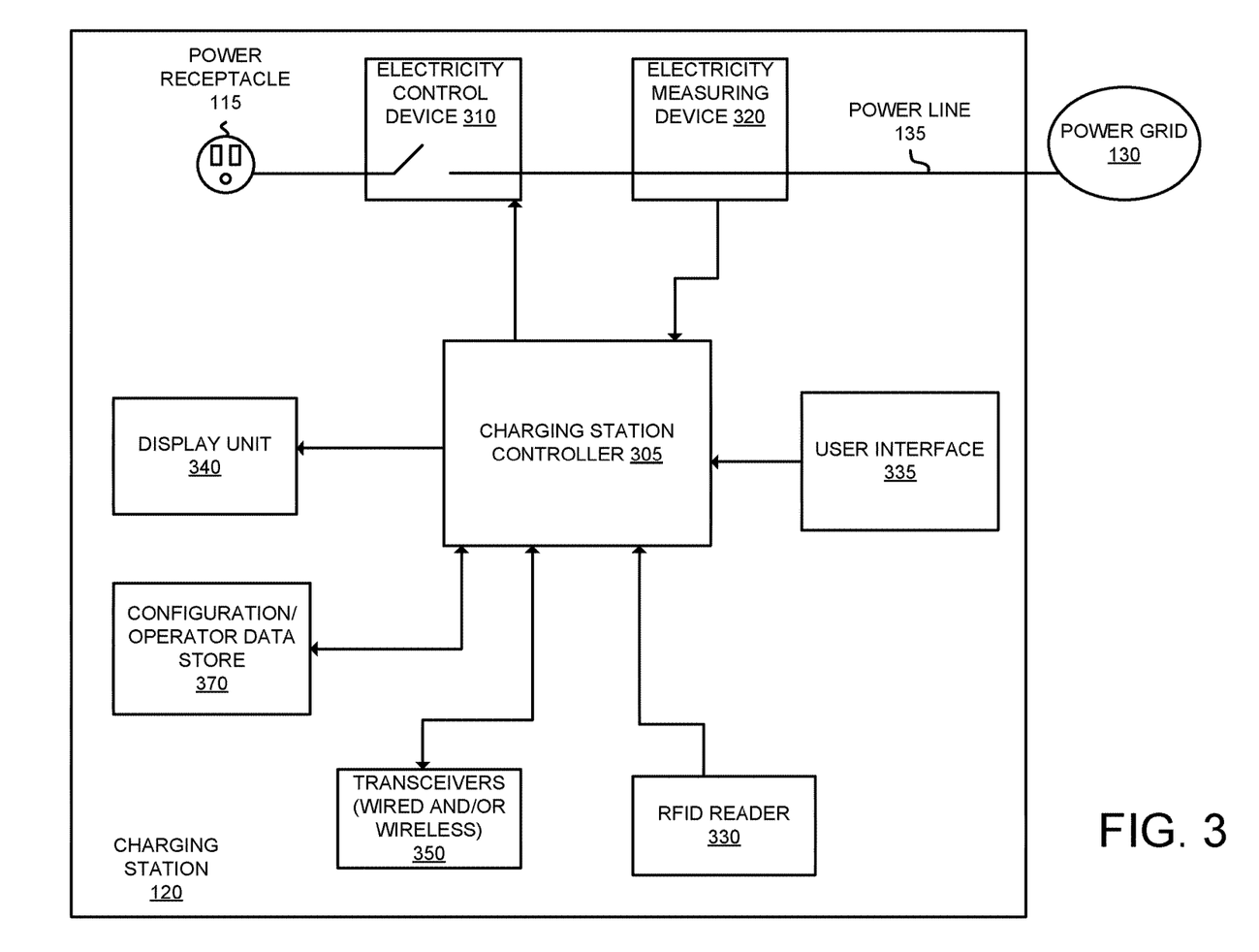
FIG. 3 illustrates an exemplary embodiment of the charging station illustrated in FIG. 1 according to one embodiment of the invention.

FIG. 3 illustrates an exemplary embodiment of the charging station 120 according to one embodiment of the invention. The charging station 120 includes the charging station controller 305, the electricity control device 310, the electricity measuring device 320, the RFID reader 330, the user interface 335, the display unit 340, and one or more transceivers 350 (e.g., wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, etc.)). It should be understood that FIG. 3 illustrates an exemplary architecture of a charging station, and other, different architectures may be used in embodiments of the invention described herein. For example, some implementations of charging stations may not include a user interface, an RFID reader, or a connection to a network.

The RFID reader 330 reads RFID tags from RFID enabled devices (e.g., smartcards, key fobs, etc., embedded with RFID tag(s)) of operators that want to use the charging station 120. For example, the operator 145 may wave/swipe the communication device 150 (if an RFID enabled device) near the RFID reader 330 to initiate a charging session from the charging station 120.

The RFID reader 330 passes the information read to the charging station controller 305. The charging station controller 305 is programmed to include instructions that establish charging sessions with the vehicles. According to one embodiment of the invention, a charging session is established after an operator has been authenticated and authorized to initiate a charging session (e.g., may use the charging station 120 at the particular time of the day), after a charging cord has been plugged into the power receptacle 115, and after the door covering the power receptacle 115 has been closed and locked. The operator 145 is authenticated and authorized based on the information the RFID reader 330 receives. While in one embodiment of the invention the charging station 120 locally stores authentication information (e.g., in the configuration/operator data store 370), in other embodiments of the invention the charging station controller 305 transmits an authorization request with a remote device (e.g., the server 180) via one of the transceivers 350. For example, the charging station controller causes an authorization request to be transmitted to the data control unit 170 over a WPAN transceiver (e.g., Bluetooth, ZigBee) or a LAN transceiver. The data control unit 170 relays the authorization request to the server 180.

In some embodiments of the invention, in addition to or in lieu of vehicle operators initiating charging sessions with RFID enabled devices, vehicle operators may use the user interface 335 to initiate charging sessions. For example, vehicle operators may enter in account and/or payment information through the user interface 335. For example, the user interface 335 may allow the operator 145 to enter in their username/password (or other information) and/or payment information. In other embodiments of the invention, vehicle operators may request charging sessions through devices remote to the charging station 120 (e.g., payment stations coupled with the charging stations).

After authorizing the operator 145, the charging station controller 305 causes the power receptacle 115 to be energized and the door covering the power receptacle 115 (if a locked door is covering the power receptacle 115) to unlock. For example, the charging station controller 305 causes the electricity control device 310 to complete the connection of the power line 135 to the power grid 130. The electricity control device 310 is a solid-state device that is controlled by the charging station controller 305 or any other device suitable for controlling the flow of electricity. In addition, the charging station controller 305 causes the door covering the power receptacle 115 to unlock allowing the operator 145 to plug in their charging cord to the power receptacle 115.

In one embodiment of the invention, the charging station 120 includes one or more sensors that may be used to detect when a charging cord has been plugged into the power receptacle 115. The sensors may be a pair of infrared emitting diodes (IRED) and a phototransistor or a photodiode. An RED emits light and a phototransistor or photodiode detects the light and converts the light into current. When the power receptacle 115 receives a plug, that plug breaks the light causing the phototransistor to stop converting light into current. In this way, the charging station 120 may determine if a plug has been inserted into the power receptacle 115. It should be understood that other sensor technologies may be used to detect whether a plug has been received at the power receptacle 115 (e.g., a microswitch pushbutton, mechanical power receptacle cover that must be rotated, etc.). In addition, in some embodiments of the invention, the charging station 120 also includes sensors to detect whether the door covering the power receptacle 115 is closed and locked.

The electricity measuring device 320 measures the amount of electricity that is flowing on the power line 135 through the power receptacle 115. While in one embodiment of the invention the electricity measuring device 320 measures flow of current, in an alternative embodiment of the invention the electricity measuring device 320 measures power draw. The electricity measuring device 320 may be an induction coil or other devices suitable for measuring electricity. The charging station controller 305 is programmed with instructions to monitor the electricity measuring device 320 and to calculate the amount of electricity being used over a given time period.

The display unit 340 is used to display messages to the operator 145 (e.g., charging status, confirmation messages, error messages, notification messages, etc.). The display unit 340 may also display parking information if the charging station 120 is also acting as a parking meter (e.g., amount of time remaining in minutes, parking violation, etc.).

The configuration/operator data store 370 stores configuration information which may be set by administrators, owners, or manufacturers of the charging station 120.

Figure 4:
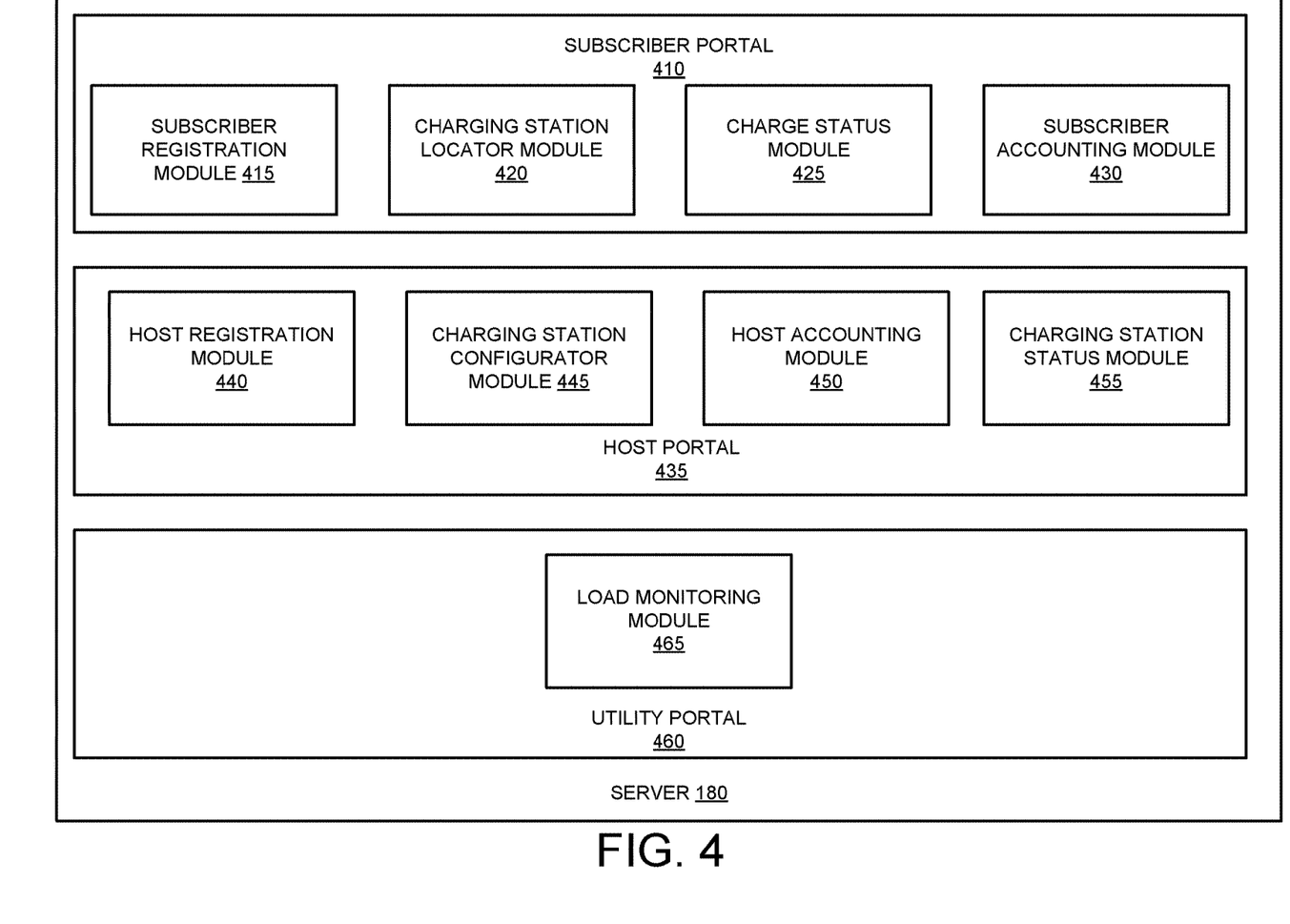
FIG. 4 illustrates exemplary portals of the charging station network server illustrated in FIG. 1 according to one embodiment of the invention.

FIG. 4 illustrates exemplary portals of the server 180 according to one embodiment of the invention. The subscriber portal 410 includes the subscriber registration module 415, the charging station locator module 420, the charge status module 425, and the subscriber accounting module 430. The subscriber registration module 415 allows potential customers (e.g., electric vehicle operators) to sign up for charging services. For example, the subscriber registration module 415 collects contact point information from subscribers (e.g., name, address, email address, telephone number, etc.), type of electric vehicle(s) and/or type of electricity storage device, and service plan information. The subscribers may select between different types and levels of services in different embodiments of the invention. For example, the subscribers may choose between different subscription plans (e.g., pay per charging session, nighttime charging, grid-friendly charging (subscribers can only charge during off-peak times (e.g., early morning, late night, or other times when the grid is experiencing low demand), anytime charging (access to the charging stations twenty-four hours a day), etc.).

In some embodiments of the invention, the subscriber registration module 415 also allows subscribers to provide notification message preferences for receiving notification messages upon certain events occurring. For example, each subscriber may provide a notification message preference to receive notification messages for each event that interests them (those events the subscriber wishes to receive notification messages on). The events of interest may include one or more suspension or termination of a charging session events, one or more charge status events, one or more update events, one or more parking events, and/or one or more alarm events. For example, each subscriber may provide a notification message preference for an event in interest (whether they want to receive a notification message for that event) for the following events: fully charged vehicle, charging has been interrupted (e.g., the charging cord has been removed from the vehicle or has been severed, the station has encountered a power loss, etc.), the utility operating the power grid has caused their charging of the vehicle to be suspended (e.g., the load on the grid exceeded a Demand Response threshold), the subscriber forgot to plug in their charging cord into their vehicle, and other events which will be described in greater detail later herein. The subscribers may choose to receive one or any combination of the above events that interest them. In addition, the subscribers may be able to choose the format of the notification messages (e.g., receive through email, through text message, etc.). In addition, the subscribers may provide one or more contact points specific for notification messages (e.g., email address(es), text message address(es) (e.g., phone number(s)), etc.). It should also be understood that one or more events may have default notification message preference values.

The charging station locator module 420 allows subscribers to locate charging stations (available and/or unavailable charging stations). The charging station locator module 420 may provide an interactive map for the subscribers to locate charging stations. The charging station locator module 420 may also provide an estimated time when the charging station will become available for use. Subscribers may also use the charging station locator module 420 to create a list of favorite charging station(s) for the server 180 to monitor their availability and notify the user (e.g., through email or text message) when those charging station(s) are available and/or unavailable. In addition, in some embodiments of the invention, the subscribers may use the charging station locator module 420 to reserve charging stations for future use.

The charge status module 425 allows subscribers to determine the charging status of their electric vehicles (that are currently being charged). According to one embodiment of the invention, the charge status module 425 presents charge status information to the subscriber (e.g., amount of power currently being transferred, total amount of power transferred, amount of energy transferred, total amount of energy transferred, the amount of time the charging session has lasted, an estimate of the time left to charge their vehicle, etc.).

The subscriber accounting module 430 allows subscribers to review accounting information (e.g., the number of sessions remaining in their subscription, payment and/or invoice information, the amount of energy transferred to the power grid, etc.), and/or generate report(s) (e.g., illustrating power consumed from the power grid, illustrating power transferred to the power grid, illustrating an estimate of the amount of gasoline saved through use of their electric vehicle(s), illustrating an estimate of the amount of greenhouse gases they have saved from outputting through use of their electric vehicle(s), illustrating the amount of money saved in gasoline costs through use of their electric vehicle(s), etc.). In addition, the subscriber accounting module 430 may allow subscribers to review a history of the charging station(s) that they most often use.

The host portal 435 allows owners and/or administrators of one or more charging stations to configure their charging station(s) and perform other functions. As used herein, a host is an owner and/or administrator of one or more charging stations. It should also be understood that a host may include operator(s) and/or administrator(s) of the charging station network (e.g., the charging station network 200). The host portal 435 includes the host registration module 440, the charging station configurator module 445, the host accounting module 450, and the charging station status module 455.

The host registration module 440 allows hosts to register their charging station(s) for service and allows hosts to set preferences. For example, the host registration module 440 allows hosts to provide contact information (e.g., name, company, address, email address(es), telephone number(s), etc.). As another example, the host preferences module 440 allows hosts to provide notification message preferences for receiving notification messages upon certain events occurring. For example, each host may provide a notification message preference to receive notification messages for each event that interests them (those events the host wishes to receive notification messages on). The events of interest may include one or more suspension or termination of a charging session events, one or more update events, and/or one or more alarm events. For example, each host may provide a notification message preference for any of the following events that interest them: a charging station has failed to respond to a periodic heartbeat from the server 180, a charging station has unexpectedly rebooted, a charging station has detected a problem, a ground fault circuit interrupter (GFCI) has tripped in a charging station, etc. and/or other events which will be described in greater detail later herein. Each host may choose to receive one or any combination of the above events that interest them, and may specify different notification message preferences for different charging stations. In addition, each host may be able to choose the format of the notification messages (e.g., receive them through email, through text message, etc.). In addition, the hosts may provide one or more contact points specific for notification messages (e.g., email address(es), text message address(es) (e.g., phone number(s)), etc.). It should also be understood that one or more events may have default notification message preference values.

The charging station configurator module 445 allows hosts to configure their charging stations (e.g., set charging station parameters on their charging station, set access parameters, etc.). The host accounting module 450 allows hosts to review accounting information (e.g., power consumed by each of their charging station(s), total power consumed by all of their charging station(s), power transferred to the power grid by each of their charging station(s), total power transferred to the power grid by all of their charging station(s), account balances, payments and invoices, etc.).

The charging station status module 455 allows hosts to view the charging status of each of their charging station(s) (e.g., current status (charging, available, out-of-service), reports on occupancy rates of their charging station(s), reports on energy usage for each of their charging station(s), etc.).

The utility portal 460 allows utilities (employees of the utilities) to monitor and manage the impact on their grid of electric vehicle charging. The load monitoring module 465 allows utilities to monitor the load for individual charging stations and/or aggregate load of all charging stations drawing power from their grid. The load monitoring module 465 may also provide the amount of load which may be sheddable (e.g., the amount of load being drawn by subscribers which have registered for grid-friendly charging, etc.). The utilities may use the information from the load monitoring module 465 to determine whether to shed load (e.g., for only those subscribers which have registered for grid-friendly charging or for all charging sessions). Upon determining to shed load of some charging stations, the server 180 may send a command to shut down service to those charging stations. In addition, the load monitoring module 465 may provide a history of use for the charging stations including the average load drawn at a time for each charging station and/or all charging stations.

While the subscriber portal 410, the host portal 435, and the utility portal 460 have been described with specific modules, it should be understood that they may have additional modules, less modules, and/or the functionality of some modules may be combined.

The server 180 is also programmed to transmit notification messages to subscribers and hosts based on data received from the charging stations (e.g., charging data, alarm data, etc.), data received from the utilities (e.g., Demand Response data, etc.), data gathered by the server 180 (e.g., network condition data, etc.), and in some embodiments of the invention, data received from the electric vehicles. Typically these notification messages take the form of electronic messages (e.g., email messages, text messages, or other forms of electronic communication).

The server 180 may be programmed to transmit notification messages to subscribers, hosts, or other persons, in different situations in different embodiments of the invention. For example, in some embodiments of the invention the server 180 is programmed to transmit notification messages to subscribers (or to other person(s) as designated by the subscribers) and/or hosts upon events that cause charging sessions to be terminated or suspended in the following situations: responsive to their charging session being administratively terminated by the owner(s) and/or administrator(s) of the charging station, responsive to the charging station detecting an over-current situation and suspending the charging session, responsive to the charging station stopping the flow of electricity to their vehicle (e.g., by de-energizing the power receptacle), responsive to their charging session expiring and being suspended, responsive to receiving a Demand Response message from a Utility to suspend charging to decrease load on the power grid, etc.

As another example, in some embodiments of the invention the server 180 is programmed to transmit notification messages to subscribers (or to other person(s) as designated by the subscribers), and/or hosts upon the following charge status events: fully charged vehicle, X percent charge, vehicle is not currently charging (e.g., operator established a charging session but has failed to plug their charging cord into their vehicle or the connection is otherwise faulty), vehicle has resumed charging (e.g., after being suspended to decrease the load on the power grid), a vehicle is currently transferring electricity to the grid, a vehicle is currently drawing electricity from the grid, etc.

The determination that the electricity storage device(s) of an electric vehicle is fully charged may be performed in different ways in different embodiments of the invention. Typically the storage capability of a particular electricity storage device for a given electric vehicle is known based on the type of electric vehicle information collected by the subscriber registration module 415. From that information, the maximum amount of time needed to charge that electricity storage device may be determined. In one embodiment of the invention, the electricity storage device of a given electric vehicle is fully charged when at least the total amount of electricity transferred to the electricity storage device meets or exceeds the storage capability amount of that electricity storage device. In another embodiment of the invention, the electricity storage device of a given electric vehicle is fully charged at least when the maximum amount of time needed to charge that electricity storage device has been meet or exceeded. In another embodiment of the invention, if the "trickle charge" amount of electricity is known for an electricity storage device, that electricity storage device is fully charged when that trickle charge amount is detected. For the embodiments described above, the determination is typically based on data received from the charging stations.

In another embodiment of the invention, the determination of a fully charged vehicle is made based on information collected from the electric vehicles. For example, some electric vehicles have the capability of transmitting status information (e.g., via PLC, WPAN, etc.) of their electricity storage devices (e.g., percent full, amount of energy needed until a full charge, full charge, etc.). This data may be transmitted directly or indirectly to the server 180 and/or the charging station 120. The server 180 and/or the charging station 120 may use the data to transmit charge status notification messages. For example, the server 180 and/or the charging station 120 may use this information in combination with the amount of electricity being transferred to the electricity storage device to determine a fully charged electricity storage device. Alternatively or additionally, the server 180 and/or charging station 120 may transmit fully charged vehicle notification messages responsive to receiving a fully charged message from the electric vehicle.

In one embodiment of the invention, the server 180 is programmed to determine that a subscriber has established a charging session with a charging station but has failed to plug their charging cord into their vehicle by examining the charging data received from that charging station. For example, if the charging data indicates that the charging session has been established for a threshold amount of seconds and the electricity transferred is below a certain threshold, the server 180 may notify the subscriber that charging has not occurred. In addition, the server 180 may transmit a command to the charging station instructing it to suspend the session and prevent electricity from flowing through the power receptacle.

In one embodiment of the invention, the server 180 is programmed to transmit notification messages to those subscribers (or to other person(s) as designated by the subscribers) which have established a charging session but have failed to plug their charging cord into their vehicle (or otherwise have a bad connection to their vehicle). For example, a vehicle operator has been authorized to use a charging station, a charging cord has been inserted into a power receptacle of the charging station, the door covering the power receptacle (if one exists) is closed and locked, but the vehicle operator has forgotten to plug the charging cord into their vehicle.

In one embodiment of the invention, the server 180 determines that a subscriber has established a charging session with a charging station but has failed to plug their charging cord into their vehicle by examining the charging data received from that charging station. For example, if the charging data indicates that the charging session has been established for a threshold amount of seconds and the electricity transferred is below a certain threshold, the server 180 may notify the subscriber that charging has not occurred. In addition, the server 180 may transmit a command to the charging station instructing it to suspend the session and prevent electricity from flowing through the power receptacle.

As another example, in some embodiments of the invention the server 180 is programmed to transmit notification messages responsive to an alarm generated by a charging station or triggered by the server 180. These notification messages may be sent to the appropriate operators, administrators, and/or owners of the charging stations experiencing an alarm event and/or to the subscribers using a charging station that is experiencing an alarm event. Example alarm events include the following: a charging station has failed to respond to a periodic heartbeat from the server 180, a charging station has unexpectedly rebooted, a charging station has detected a problem (hardware and/or software), a GFCI in the charging station has tripped, a software and/or firmware update/upgrade on a charging station has completed and/or failed, the software and/or firmware on a charging station has reverted to an old version, etc.

As another example, in some embodiments of the invention the server 180 is programmed to transmit update notification messages to the subscribers responsive to certain update events. Example update events include the following: a favorite charging station or often used charging station is available and/or unavailable, a new charging station has been installed in a close location, a subscriber has run out of (or is close to running out of) charging sessions, a subscriber has failed or completed a credit card authorization check (e.g., credit card has expired), the door covering the power receptacle where their charging cord is attached has been opened by an unauthorized user, etc.

As yet another example, in some embodiments of the invention the server 180 is programmed to transmit notification messages to subscribers responsive to parking events including the following: exceeded parking time (or close to exceeding the parking time), parking reservation confirmation, unused parking reservation (e.g., a subscriber has reserved a parking spot but did not use the spot and/or did not charge at a corresponding charging station), parking reservation time extension confirmation, etc.

While embodiments have been described with reference to the server transmitting notification messages, in alternative embodiments of the invention the charging stations may include logic to determine whether to transmit notification messages to subscribers and/or hosts. For example, the charging station controller 305 may be programmed to determine whether to transmit notification messages to subscribers using the charging station or to the host associated with the charging station. Thus, in some embodiments of the invention, the charging station 120 may include the notification message preferences of the operator 145 and the administrator(s) and/or owner(s) of the charging station 120. In addition, in some embodiments, the charging stations may transmit the notification messages to subscribers and/or hosts.

Figure 5:
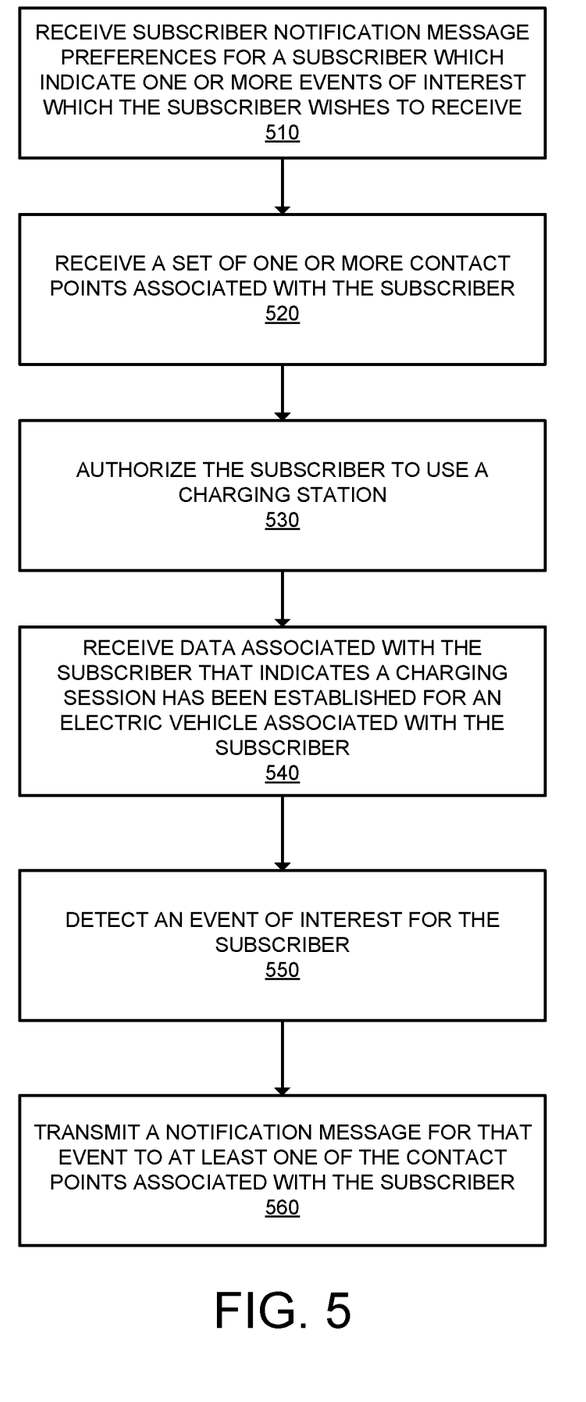
FIG. 5 is a flow diagram illustrating exemplary operations for transmitting notification messages to subscribers according to one embodiment of the invention.

FIG. 5 is a flow diagram illustrating exemplary operations for transmitting notification messages to subscribers according to one embodiment of the invention. The operations of FIG. 5 will be described with reference to the exemplary embodiments of FIGS. 1 and 4. However, it should be understood that the operations of FIG. 5 can be performed by embodiments of the invention other than those discussed with reference to FIGS. 1 and 4, and the embodiments discussed with reference to FIGS. 1 and 4 can perform operations different than those discussed with reference to FIG. 5.

According to one embodiment of the invention the operations of FIG. 5 are performed by servers (e.g., the server 180). At block 510, the server 180 receives notification message preferences for a subscriber (e.g., the operator 145) which indicate one or more events of interest which the subscriber wishes to receive notification messages on. While in one embodiment of the invention the server 180 receives these notification message preferences from the subscriber using the subscriber registration module 415, in other embodiments of the invention the server 180 receives these notification message preferences differently (e.g., via email, via text message, from a charging station, etc.). Flow moves from block 510 to block 520.

At block 520, the server 180 receives a set of one or more contact points (e.g., email address(es), text message address(es), etc.) associated with the subscriber. While in one embodiment of the invention the server 180 receives the set of contact points from the subscriber using the subscriber registration module 415, in other embodiments of the invention the server 180 receives the set of contact points differently (e.g., via email, via text message, from a charging station, etc.). Flow moves from block 520 to block 530.

At block 530, the server 180 authorizes the subscriber to use a charging station. For example, the server 180 authorizes the operator 145 to use the charging station 120. In some embodiments, the authorization is performed in response to the server 180 receiving an authorization request from the charging station 120, while in other embodiments, the authorization is performed in response to the server 180 receiving an authorization request from the subscriber (e.g., the operator 145) directly. Flow moves from block 530 to block 540.

At block 540, the server 180 receives data associated with the subscriber that indicates a charging session has been established for an electric vehicle (e.g., electric vehicle 110) associated with the subscriber. The data received may be transmitted by the charging station 120. The data includes information identifying the subscriber (e.g., an RFID tag uniquely associated with the subscriber) and information indicating that a charging session has been established. Flow moves from block 540 to block 550.

At block 550, the server 180 detects an event of interest for the subscriber. The server 180 may detect an event of interest for the subscriber (e.g., operator 145) based on data received from the charging stations (e.g., data related to the charging of the vehicle 110, data related to alarms detected and/or generated at the charging station, etc.), data received from the utility operating the power grid 130 (e.g., Demand Response data, etc.), data gathered by the server 180 (e.g., network condition data, etc.), data provided by the administrator(s) and/or owner(s) of the charging station 120, (e.g., network operation data), and in some embodiments of the invention, data received from the electric vehicle 110 (e.g., data related to the charging of the electric vehicle 110). Flow moves from block 550 to block 560.

Responsive to detecting an event of interest for the subscriber, at block 560 the server 180 transmits a notification message for that event to at least one of the contact points associated with the subscriber. The notification message sent is an email, text message, or other electronic communication to one or more addresses as specified by the subscriber (which may be provided using the subscriber registration module 415). As described above, the subscriber may specify the format of the notification message (e.g., email, text message, etc.) and the recipient of the message using the subscriber registration module 415.

Figure 6:
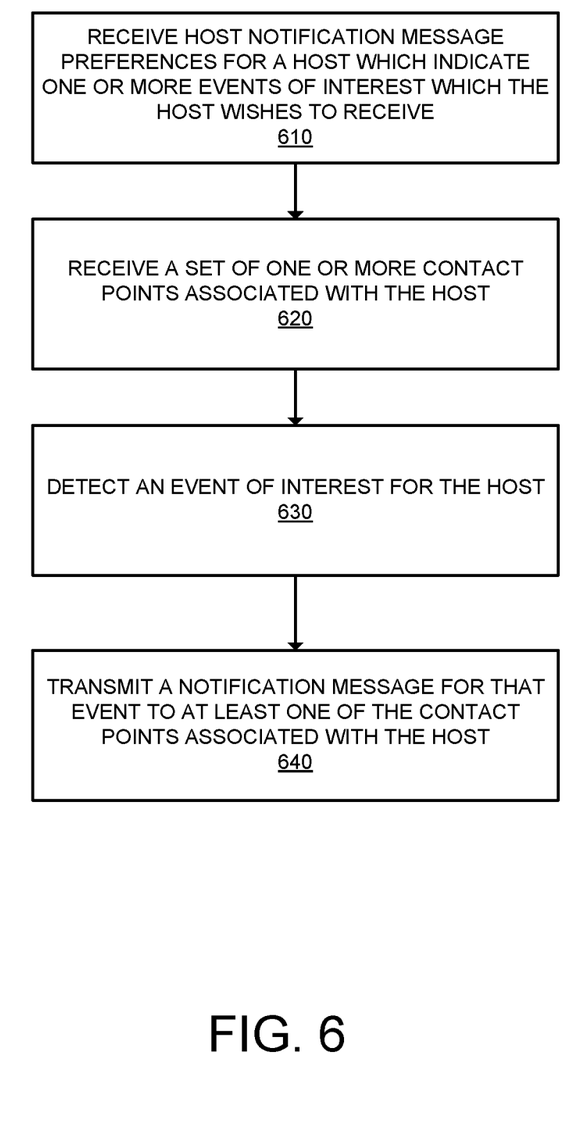
FIG. 6 is a flow diagram illustrating exemplary operations for transmitting notification messages to hosts according to one embodiment of the invention.

FIG. 6 is a flow diagram illustrating exemplary operations for transmitting notification messages to hosts according to one embodiment of the invention. The operations of FIG. 6 will be described with reference to the exemplary embodiments of FIGS. 1 and 4. However, it should be understood that the operations of FIG. 6 can be performed by embodiments of the invention other than those discussed with reference to FIGS. 1 and 4, and the embodiments discussed with reference to FIGS. 1 and 4 can perform operations different than those discussed with reference to FIG. 6. In addition, the operations described with reference to FIG. 6 may be performed in combination to, or separate from, the operations described with reference to FIG. 5.

At block 610, the server 180 receives notification message preferences for a host (e.g., an owner or administrator of the charging station 120 and/or operator(s) and/or administrator(s) of the charging station network 200) which indicates one or more events of interest which the host wishes to receive notification messages for. While in one embodiment of the invention the server 180 receives these notification message preferences from the host using the host registration module 440, in other embodiments of the invention the server 180 receives these preferences differently (e.g., via email, via text message, etc.). Flow moves from block 610 to block 620.

At block 620, the server 180 receives a set of one or more contact points (e.g., email address(es), text message address(es), etc.) associated with the host. While in one embodiment of the invention the server 180 receives the set of contact points from the host using the host registration module 440, in other embodiments of the invention the server 180 receives the set of contact points differently (e.g., via email, via text message, etc.). Flow moves from block 620 to block 630.

At block 630, the server 180 detects an event of interest for the host. The server 180 may detect an event of interest for the host based on data received from those charging station(s) the host owns or operates (e.g., data related to vehicle charging at their charging station(s), data related to alarms detected and/or generated at their charging station(s), etc.), data received from the utility(ies) operating the power grid(s) for their charging station(s) (e.g., Demand Response data, etc.), data gathered by the server 180 for their charging station(s) (e.g., network condition data, hardware/software upgrade status of the charging stations, etc.), and in some embodiments of the invention, data received from the electric vehicles (e.g., data related to the charging of the electric vehicles at their charging station(s)). Flow moves from block 630 to 640.

Responsive to detecting an event of interest for the host, at block 640 the server 180 transmits a notification message for that event to at least one of the contact points associated with the host. The notification message sent is an email, text message, or other electronic communication to one or more addresses as specified by the host (which may be provided using the host registration module 440). As described above, the host may specify the format of the notification message (e.g., email, text message, etc.) and the recipient of the message using the host registration module 440.

Figure 7:
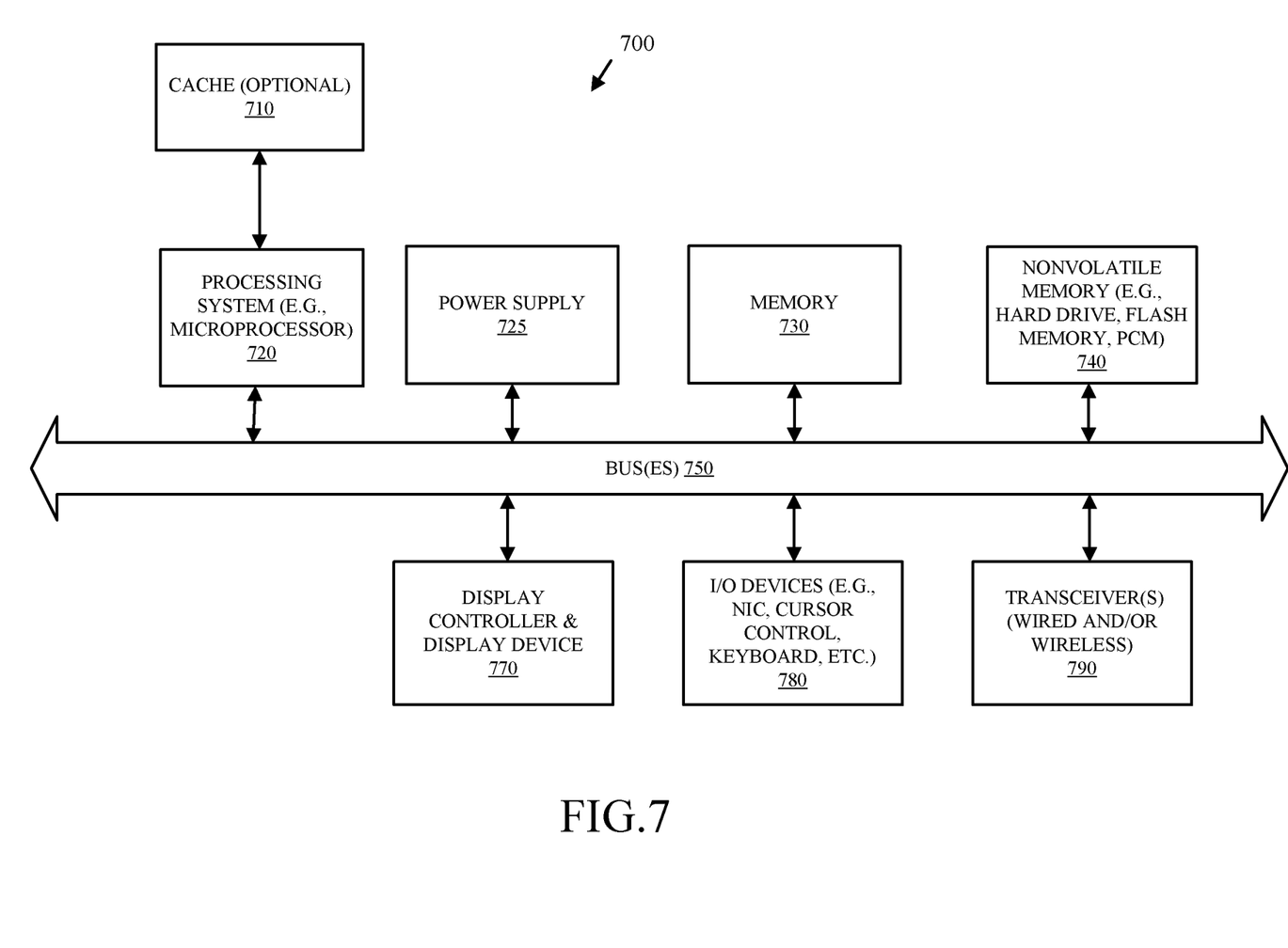
FIG. 7 is a block diagram illustrating an exemplary architecture of a computing device that may be used in some embodiments of the invention.

FIG. 7 is a block diagram illustrating an exemplary architecture of a computing device which may be used in embodiments of the invention. For example, the architecture of the computing device 700 may be an architecture of the server 180 and or the charging station 120 in some embodiments of the invention. It should be understood that while FIG. 7 illustrates various components of a computing device, it is not intended to represent any particular architecture or manner of interconnecting the components as such details are not germane to the present invention. It will be appreciated that other computing devices that have fewer components or more components may also be used with the present invention.

As illustrated in FIG. 7, the computing device 700 includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations as described above. The bus 750 interconnects the above components together and also interconnects those components to the display controller & display device 770, Input/Output device(s) 780 (e.g., NIC (Network Interface Card), a cursor control (e.g., mouse, touchscreen, touchpad, etc.), a keyboard, etc.), and the transceiver(s) 1290 (wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, RFID, etc.)).

While embodiments of the invention have been described in reference to the power receptacles receiving charging cords, in alternative embodiments of the invention the charging cord may be attached differently to the charging station (e.g., the charging cord is permanently attached to the power receptacle and each of the electric vehicle operators use the same charging cord, the charging cord is permanently attached to the electricity source of the charging station, etc.).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed on a charging station network server that manages a plurality of charging stations, the method comprising:
   receiving subscriber notification message preferences for a subscriber of electric vehicle charging service that indicate a set of one or more events of interest for which the subscriber wishes to receive notification messages, wherein the set of events of interest includes a fully charged electric vehicle and that a charging session has been interrupted;
   receiving data associated with the subscriber that indicates a first charging session at one of the plurality of charging stations has been authorized and established for an electric vehicle associated with the subscriber;
   detecting, from data received from the one of the plurality of charging stations associated with the first charging session, one of the set of one or more events of interest for which the subscriber wishes to receive notification messages including that the electric vehicle associated with the subscriber is fully charged;
   responsive to the detecting that the electric vehicle associated with the subscriber is fully charged, transmitting a first notification message to the subscriber that the electric vehicle associated with the subscriber is fully charged;
   receiving data associated with the subscriber that indicates a second charging session at one of the plurality of charging stations has been authorized and established for the electric vehicle associated with the subscriber;
   detecting, from data received from the one of the plurality of charging stations associated with the second charging session, that the second charging session of the electric vehicle has been interrupted unexpectedly; and
   responsive to the detecting that the second charging session of the electric vehicle has been interrupted unexpectedly, transmitting a second notification message to the subscriber that the second charging session of the electric vehicle has been interrupted.

2. The method of claim 1, wherein the first and second notification messages are transmitted to at least one of a set of one or more contact points associated with the subscriber through an email message, a text message, or other electronic communication.

3. The method of claim 1, wherein at least another one of the set of events of interest includes a suspension or termination of the charging session.

4. The method of claim 1, wherein at least another one of the set of events of interest includes a charge status event that includes one or more of: electric vehicle is not currently charging, electric vehicle has resumed charging, electric vehicle is currently transferring electricity to a grid, and electric vehicle is currently drawing electricity from the grid.

5. The method of claim 1, further comprising:
   wherein at least another one of the set of events of interest is related to an update event;
   detecting the update event; and responsive to the detecting the update event, transmitting a third notification message for the update event to the subscriber.

6. The method of claim 1, further comprising:
wherein at least another one of the set of events of interest is related to a parking event;
detecting the parking event; and
responsive to the detecting the parking event, transmitting a third notification message for the parking event to the subscriber.

7. The method of claim 1, further comprising:
receiving host notification message preferences for a host of the charging station network server that indicate one or more events of interest for which the host wishes to receive notification messages, wherein the host is an owner or administrator of the plurality of charging stations;
detecting one of the one or more events of interest for which the host wishes to receive notification messages; and
responsive to the detecting the one of the one or more events of interest for which the host wishes to receive notification messages, transmitting a third notification message for that event of interest to the host of the charging station network server.

8. The method of claim 7, wherein the third notification message is transmitted to at least one of a set of one or more contact points associated with the host through an email message, a text message, or other electronic communication.

9. The method of claim 8, wherein the detected event of interest for the host corresponds with an alarm event that is one of: one of the plurality of charging stations has failed to respond to a periodic heartbeat from the charging station network server, one of the plurality of charging stations has unexpectedly rebooted, one of the plurality of charging stations has detected a hardware or software problem, a ground fault circuit interrupter on one of the plurality of charging stations has tripped, a firmware update on one of the plurality of charging stations has completed, a firmware update on one of the plurality of charging stations has failed, and one of the plurality of charging stations has reverted to a previous firmware version.

10. A charging station network server that manages a plurality of charging stations, comprising:
a processor to execute instructions, and
a memory coupled with the processor, the memory storing one or more instructions that, when executed, cause the processor to perform operations including,
receive subscriber notification message preferences for a subscriber of electric vehicle charging service that indicate a set of one or more events of interest for which the subscriber wishes to receive notification messages, wherein the set of events of interest includes a fully charged electric vehicle and that a charging session has been interrupted;
receive data associated with the subscriber that indicates a first charging session at one of the plurality of charging stations has been authorized and established for an electric vehicle associated with the subscriber;
detect, from data received from the one of the plurality of charging stations associated with the first charging session, one of the set of one or more events of interest for which the subscriber wishes to receive notification messages including that the electric vehicle associated with the subscriber is fully charged;
responsive to the detection that the electric vehicle associated with the subscriber is fully charged, transmit a first notification message to the subscriber that the electric vehicle associated with the subscriber is fully charged;
receive data associated with the subscriber that indicates a second charging session at one of the plurality of charging stations has been authorized and established for the electric vehicle associated with the subscriber;
detect, from data received from the one of the plurality of charging stations associated with the second charging session, that the second charging session of the electric vehicle has been interrupted unexpectedly; and
responsive to the detecting that the second charging session of the electric vehicle has been interrupted unexpectedly, transmit a second notification message to the subscriber that the second charging session of the electric vehicle has been interrupted.

11. The charging station network server of claim 10, wherein the first and second notification messages are to be transmitted to at least one of a set of one or more contact points associated with the subscriber through an email message, a text message, or other electronic communication.

12. The charging station network server of claim 10, wherein at least another one of the set of events of interest includes a suspension or termination of the charging session.

13. The charging station network server of claim 10, wherein at least another one of the set of events of interest includes a charge status event that includes one or more of: electric vehicle is not currently charging, electric vehicle has resumed charging, electric vehicle is currently transferring electricity to a grid, and electric vehicle is currently drawing electricity from the grid.

14. The charging station network server of claim 10, wherein the memory further stores one or more instructions that, when executed, cause the processor to perform operations including:
wherein at least another one of the set of events of interest is related to an update event;
detect the update event; and
responsive to the detection of the update event, transmit a third notification message for the update event to the subscriber.

15. The charging station network server of claim 10, wherein the memory further stores one or more instructions that, when executed, cause the processor to perform operations including:
wherein at least another one of the set of events of interest is related to a parking event;
detect the parking event; and
responsive to the detection of the parking event, transmit a third notification message for the parking event to the subscriber.

16. The charging station network server of claim 10, wherein the memory further stores one or more instructions that, when executed, cause the processor to perform operations including:
receive host notification message preferences for a host of the charging station network server that indicate one or more events of interest for which the host wishes to receive notification messages, wherein the host is an owner or administrator of the plurality of charging stations;
detect one of the one or more events of interest for which the host wishes to receive notification messages; and responsive to the detection of the one of the one or more events of interest for which the host wishes to receive notification messages, transmit a third notification message for that event of interest to the host of the charging station network server.

17. The charging station network server of claim 16, wherein the third notification message is to be transmitted to at least one of a set of one or more contact points associated with the host through an email message, a text message, or other electronic communication.

18. The charging station network server of claim 17, wherein the detected event of interest for the host corresponds with an alarm event that is one of: one of the plurality of charging stations has failed to respond to a periodic heartbeat from the charging station network server, one of the plurality of charging stations has unexpectedly rebooted, one of the plurality of charging stations has detected a hardware or software problem, a ground fault circuit interrupter on one of the plurality of charging stations has tripped, a firmware update on one of the plurality of charging stations has completed, a firmware update on one of the plurality of charging stations has failed, and one of the plurality of charging stations has reverted to a previous firmware version.

19. A non-transitory machine-readable storage medium that provides instructions that, when executed by a processor on a charging station network server that manages a plurality of charging stations, cause said processor to perform operations comprising:
receiving subscriber notification message preferences for a subscriber of electric vehicle charging service that indicate a set of one or more events of interest for which the subscriber wishes to receive notification messages, wherein the set of events of interest includes a fully charged electric vehicle and that a charging session has been interrupted;
receiving data associated with the subscriber that indicates a first charging session at one of the plurality of charging stations has been authorized and established for an electric vehicle associated with the subscriber;
detecting, from data received from the one of the plurality of charging stations associated with the first charging session, one of the set of one or more events of interest for which the subscriber wishes to receive notification messages including that the electric vehicle associated with the subscriber is fully charged;
responsive to the detecting that the electric vehicle associated with the subscriber is fully charged, transmitting a first notification message to the subscriber that the electric vehicle associated with the subscriber is fully charged;
receiving data associated with the subscriber that indicates a second charging session at one of the plurality of charging stations has been authorized and established for the electric vehicle associated with the subscriber;
detecting, from data received from the one of the plurality of charging stations associated with the second charging session, that the second charging session of the electric vehicle has been interrupted unexpectedly; and
responsive to the detecting that the second charging session of the electric vehicle has been interrupted unexpectedly, transmitting a second notification message to the subscriber that the second charging session of the electric vehicle has been interrupted.

20. The non-transitory machine-readable storage medium of claim 19, wherein the first and second notification messages are to be transmitted to at least one of a set of one or more contact points associated with the subscriber through an email message, a text message, or other electronic communication.

21. The non-transitory machine-readable storage medium of claim 19, wherein at least another one of the set of events of interest includes a suspension or termination of the charging session.

22. The non-transitory machine-readable storage medium of claim 19, wherein at least another one of the set of events of interest includes a charge status event that includes one or more of: electric vehicle is not currently charging, electric vehicle has resumed charging, electric vehicle is currently transferring electricity to a grid, and electric vehicle is currently drawing electricity from the grid.

23. The non-transitory machine-readable storage medium of claim 19, wherein the operations further comprise:
wherein at least another one of the set of events of interest is related to an update event;
detecting the update event; and
responsive to the detecting the update event, transmitting a third notification message for the update event to the subscriber.

24. The non-transitory machine-readable storage medium of claim 19, wherein the operations further comprise:
wherein at least another one of the set of events of interest is related to a parking event;
detecting the parking event; and
responsive to the detecting the parking event, transmitting a third notification message for the parking event to the subscriber.

25. The non-transitory machine-readable storage medium of claim 19, wherein the operations further comprise:
receiving host notification message preferences for a host of the charging station network server that indicate one or more events of interest for which the host wishes to receive notification messages, wherein the host is an owner or administrator of the plurality of charging stations;
detecting one of the one or more events of interest for which the host wishes to receive notification messages; and
responsive to the detecting the one of the one or more events of interest for which the host wishes to receive notification messages, transmitting a third notification message for that event of interest to the host of the charging station network server.

26. The non-transitory machine-readable storage medium of claim 25, wherein the third notification message is transmitted to at least one of a set of one or more contact points associated with the host through an email message, a text message, or other electronic communication.

27. The non-transitory machine-readable storage medium of claim 26, wherein the detected event of interest for the host corresponds with an alarm event that is one of: one of the plurality of charging stations has failed to respond to a periodic heartbeat from the charging station network server, one of the plurality of charging stations has unexpectedly rebooted, one of the plurality of charging stations has detected a hardware or software problem, a ground fault circuit interrupter on one of the plurality of charging stations has tripped, a firmware update on one of the plurality of charging stations has completed, a firmware update on one of the plurality of charging stations has failed, and one of the plurality of charging stations has reverted to a previous firmware version.

* * * * *